US007334857B2

(12) United States Patent
Hakamada

(10) Patent No.: US 7,334,857 B2
(45) Date of Patent: Feb. 26, 2008

(54) IMAGE PROCESSING APPARATUS, IMAGE PROCESSING METHOD, AND IMAGE PROCESSING PROGRAM PRODUCT

(75) Inventor: Junichi Hakamada, Ibaraki-ken (JP)

(73) Assignee: Riso Kagaku Corporation, Tokyo (JP)

( * ) Notice: Subject to any disclaimer, the term of this patent is extended or adjusted under 35 U.S.C. 154(b) by 400 days.

(21) Appl. No.: 11/199,283

(22) Filed: Aug. 9, 2005

(65) Prior Publication Data
US 2006/0044346 A1    Mar. 2, 2006

(30) Foreign Application Priority Data
Aug. 10, 2004    (JP)    ............ P2004-233313

(51) Int. Cl.
B41J 29/38    (2006.01)
(52) U.S. Cl. .......................... 347/14; 347/43
(58) Field of Classification Search .................. 347/14, 347/15, 43
See application file for complete search history.

(56) References Cited
U.S. PATENT DOCUMENTS
7,066,568 B2 *    6/2006    Komatsu et al. .............. 347/18

7,251,058 B2 *    7/2007    Pop .............................. 358/1.9

FOREIGN PATENT DOCUMENTS
JP    2002-144690    5/2002

* cited by examiner

Primary Examiner—Thinh Nguyen
(74) Attorney, Agent, or Firm—The Nath Law Group; Jerald L. Meyer; Stanley N. Protiga

(57) ABSTRACT

An image processing apparatus includes: a color paper/color ink register registering information on m kinds of color papers and information on n kinds of color inks, both which are usable for multicolor-printing a multicolor original image, in a color paper/color ink list; a color combinator listing up all combinations of k kinds of color papers, arbitrarily selected from the m kinds of color papers, and l kinds of color inks, arbitrarily selected from the n kinds of color inks; a color image creator creating color images colored in given image data corresponding to the multicolor original image for each combination; and a coloration selector selecting a coloration of a color image, selected by a user from among the color images, as a coloration for actually multicolor-printing the multicolor original image.

16 Claims, 8 Drawing Sheets

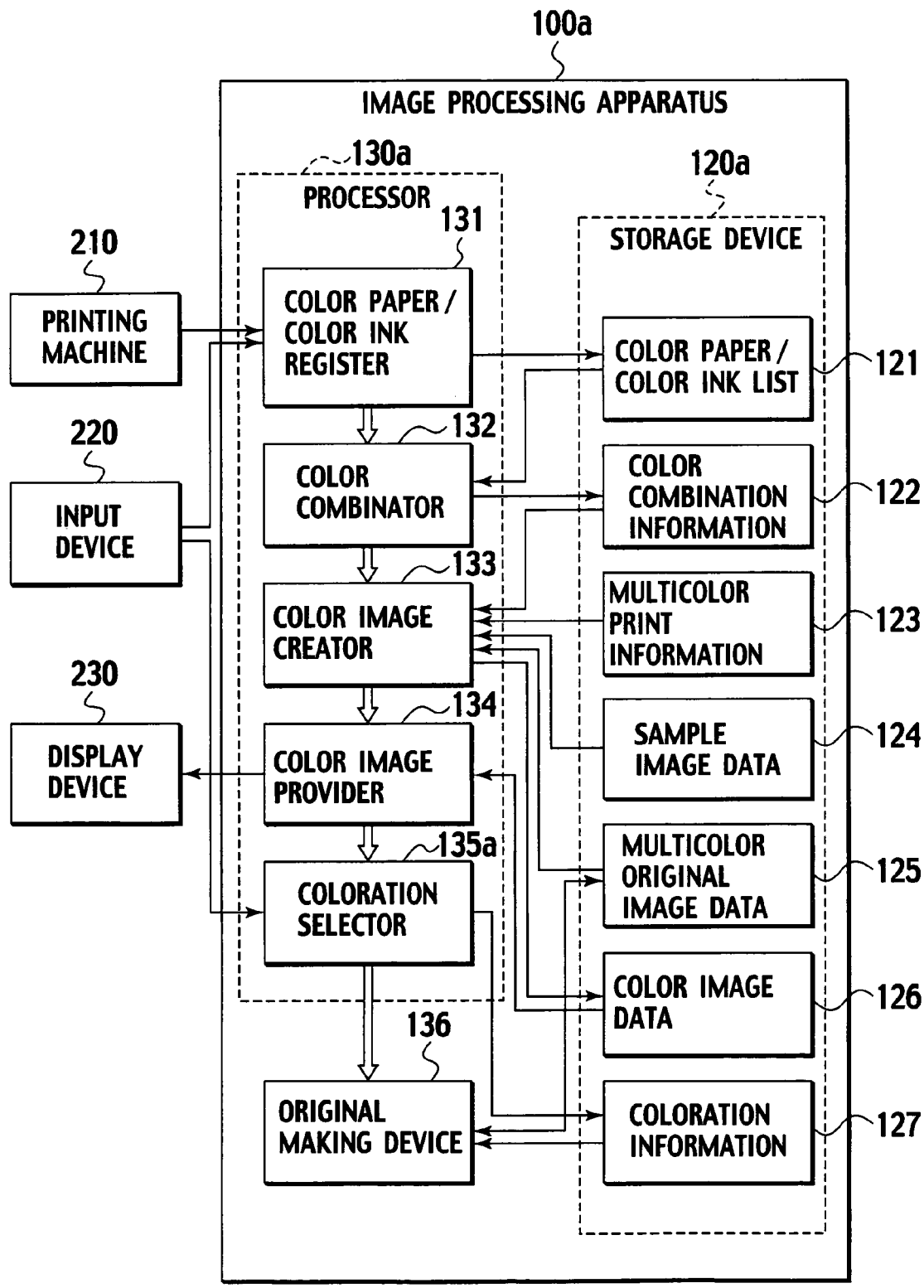

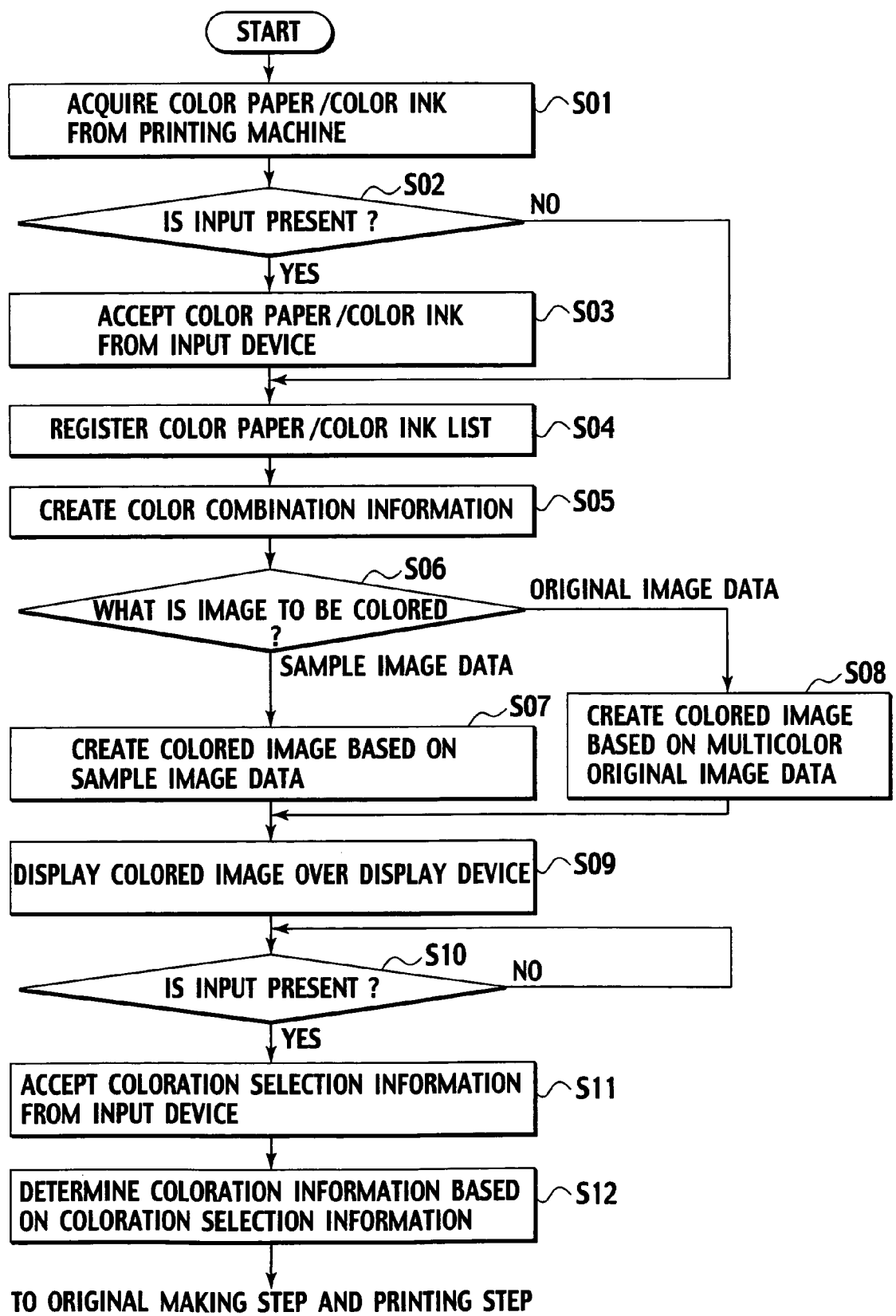

| No. | COLOR PAPER |
|---|---|
| 1 | P1 |
| 2 | P2 |

| No. | COLOR INK |
|---|---|
| 1 | C1 |
| 2 | C2 |
| 3 | C3 |

| COLOR COMBINATION | COLOR PAPER | FIRST COLOR INK | SECOND COLOR INK |
|---|---|---|---|
| ELEMENT 1 | P1 | C1 | C2 |
| ELEMENT 2 | P1 | C2 | C3 |
| ELEMENT 3 | P1 | C1 | C3 |
| ELEMENT 4 | P2 | C1 | C2 |
| ELEMENT 5 | P2 | C2 | C3 |
| ELEMENT 6 | P2 | C1 | C3 |

FIG.6

| No. | OBJECT | COLORATION | PRINT COLOR |
|---|---|---|---|
| 1 | FIRST OBJECT (TEXT) | FIRST COLOR INK(C1) | FIRST COLOR INK(C1) + COLOR PAPER(P1) |
| 2 | SECOND OBJECT (LINE DRAWING) | SECOND COLOR INK (C2) | SECOND COLOR INK(C2) + COLOR PAPER(P1) |
| 3 | THIRD OBJECT (GRAPHIC) | FIRST COLOR INK(C1) | FIRST COLOR INK(C1) + COLOR PAPER(P1) |
| 4 | FOURTH OBJECT (PHOTOGRAPH) | FIRST COLOR INK(C1) + SECOND COLOR INK (C2) | FIRST COLOR INK(C1) + SECOND COLOR INK(C2) + COLOR PAPER(P1) |
| 5 | BACKGROUND | COLOR PAPER(P1) | COLOR PAPER(P1) |

FIG.7A

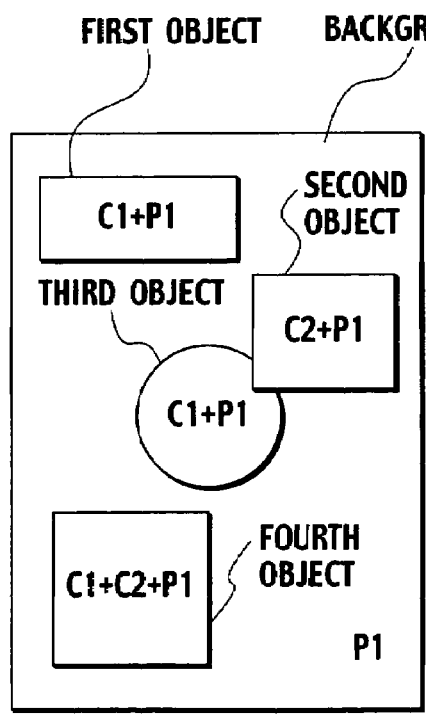

[COMBINATION 1]

FIG.7B

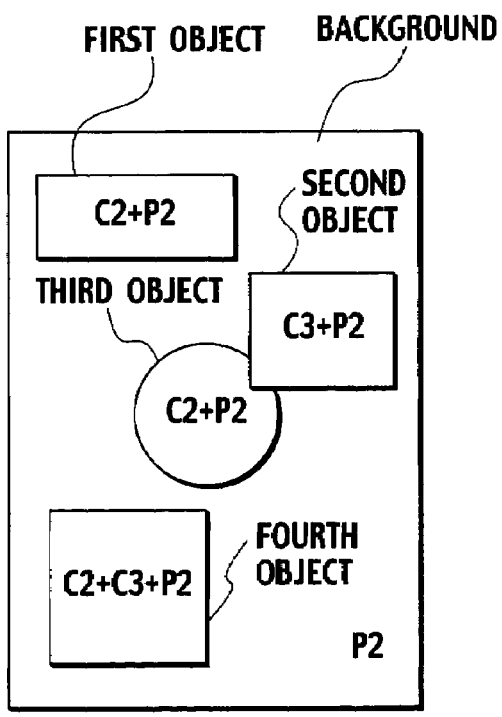

[COMBINATION 5]

IMAGE PROCESSING APPARATUS, IMAGE PROCESSING METHOD, AND IMAGE PROCESSING PROGRAM PRODUCT

BACKGROUND OF THE INVENTION

1. Field of the Invention

The present invention relates to an image processing apparatus, an image processing method, and an image processing program product for providing coloration when a multicolor original image is multicolor-printed with a plurality of color inks.

2. Description of the Related Art

A stencil printing machine, disclosed by Japanese Patent Application Laid-open No. 2002-144690, outputs various multicolor print products by arbitrarily combining color inks and color papers. This stencil printing machine provides a user with create a multicolor original image by the user specifying colors, so-called "coloration", for each object such as a photograph, an illustration, a text, and a graphic.

SUMMARY OF THE INVENTION

However, it is troublesome work for the user to estimate which combination of the color inks and the color papers is effective for the multicolor print products to be obtained on a level closer to an actual multicolor original image. In particular, in cases where the objects includes a full-color photograph, a full-color illustration, or the like, it is extremely hard work to select color inks and color papers to be used and determine an optimum coloration based on the selection.

In addition, if, after creating a multicolor original image, the user tries the other colorations, then the user has to specify colors for each object again. This work imposes a heavy burden on the user.

The present invention is completed with the above issue in mind and has a purpose to provide an image processing apparatus, an image processing method, and an image processing program product for providing a user with an optimum coloration when a process of multicolor-printing a multicolor original image with a plurality of color inks is performed.

A first aspect of the present invention provides an image processing apparatus comprising: a color paper/color ink register registering information on m kinds of color papers and information on n kinds of color inks, both which are usable for multicolor-printing a multicolor original image, in a color paper/color ink list, where the numbers m and n are natural numbers, respectively; a color combinator listing up all combinations of k kinds of color papers, arbitrarily selected from the m kinds of color papers, and l kinds of color inks, arbitrarily selected from the n kinds of color inks, where the numbers k and l are natural numbers that satisfy $k \leq m$ and $l \leq n$, respectively; a color image creator creating color images colored in given image data for each combination; and a coloration selector selecting a coloration of a color image, selected by a user from among the color images, as a coloration for actually multicolor-printing the multicolor original image.

A second aspect of the present invention provides an image processing apparatus, comprising: a color paper/color ink register registering information on m kinds of color papers and information on n kinds of color inks, both which are usable for multicolor-printing a multicolor original image, in a color paper/color ink list, where the numbers m and n are natural numbers, respectively; a color combinator listing up all combinations of k kinds of color papers, arbitrarily selected from the m kinds of color papers, and l kinds of color inks, arbitrarily selected from the n kinds of color inks, where the numbers k and l are natural numbers that satisfy $k \leq m$ and $l \leq n$, respectively; a color reproduction range calculator calculating a color reproduction range in a given color space for each combination; a color distribution pattern calculator calculating a color distribution pattern in the given color space based on the multicolored original image; and a coloration selector selecting a coloration for actually overprinting the multicolored original image based on the color reproduction range and the color distribution pattern.

A third aspect of the present invention provides an image processing method comprising: registering information on m kinds of color papers and information on n kinds of color inks, both which are usable for multicolor-printing a multicolor original image, in a color paper/color ink list, where the numbers m and n are natural numbers, respectively; listing up all combinations of k kinds of color papers, arbitrarily selected from the m kinds of color papers, and l kinds of color inks, arbitrarily selected from the n kinds of color inks, where the numbers k and l are natural numbers that satisfy $k \leq m$ and $l \leq n$, respectively; creating color images colored in given image data for each combination; and selecting a coloration of a color image, selected by a user from among the color images, as a coloration for actually multicolor-printing the multicolor original image.

A fourth aspect of the present invention provides an image processing method comprising: registering information on m kinds of color papers and information on n kinds of color inks, both which are usable for multicolor-printing a multicolor original image, in a color paper/color ink list, where the numbers m and n are natural numbers, respectively; listing up all combinations of k kinds of color papers, arbitrarily selected from the m kinds of color papers, and l kinds of color inks, arbitrarily selected from the n kinds of color inks, where the numbers k and l are natural numbers that satisfy $k \leq m$ and $l \leq n$, respectively; calculating a color reproduction range in a given color space for each combination; calculating a color distribution pattern in the given color space based on the multicolored original image; and selecting a coloration for actually overprinting the multicolored original image based on the color reproduction range and the color distribution pattern.

A fifth aspect of the present invention provides A computer program product for causing a computer to function as an image processing apparatus, the computer program product comprising: a first computer program code for causing the computer to register information on m kinds of color papers and information on n kinds of color inks, both which are usable for multicolor-printing a multicolor original image, in a color paper/color ink list, where the numbers m and n are natural numbers, respectively; a second computer program code for causing the computer to list up all combinations of k kinds of color papers, arbitrarily selected from the m kinds of color papers, and l kinds of color inks, arbitrarily selected from the n kinds of color inks, where the numbers k and l are natural numbers that satisfy $k \leq m$ and $l \leq n$, respectively; a third computer program code for causing the computer to create color images colored in given image data for each combination; and a fourth computer program code for causing the computer to select a coloration of a color image, selected by a user from among the color images, as a coloration for actually multicolor-printing the multicolor original image.

A sixth aspect of the present invention provides A computer program product for causing a computer to function as an image processing apparatus, the computer program product comprising: a first computer program code for causing the computer to register information on m kinds of color papers and information on n kinds of color inks, both which are usable for multicolor-printing a multicolor original image, in a color paper/color ink list, where the numbers m and n are natural numbers, respectively; a second computer program code for causing the computer to list up all combinations of k kinds of color papers, arbitrarily selected from the m kinds of color papers, and l kinds of color inks, arbitrarily selected from the n kinds of color inks, where the numbers k and l are natural numbers that satisfy $k \leq m$ and $1 \leq n$, respectively; a third computer program code for coursing the computer to calculate a color reproduction range in a given color space for each combination; a fourth computer program code for causing the computer to calculating a color distribution pattern in the given color space based on the multicolored original image; and a fifth computer program code for causing the computer to select a coloration for actually overprinting the multicolored original image based on the color reproduction range and the color distribution pattern.

BRIEF DESCRIPTION OF THE DRAWINGS

FIG. 1 is a schematic block diagram illustrating a structure of an image processing apparatus of a first embodiment.

FIG. 2 is a flowchart showing an example of a procedure executed by the image processing apparatus shown in FIG. 1.

FIG. 6 is a view showing an example of multicolor print information.

FIGS. 7A and 7B are views showing examples of coloring the sample image data shown in FIG. 5 for the color combination information shown in FIG. 4, based on the multicolor print information shown in FIG. 6.

DETAILED DESCRIPTION OF THE PREFERRED EMBODIMENTS

Figures 3A, 3B, 4, 5:
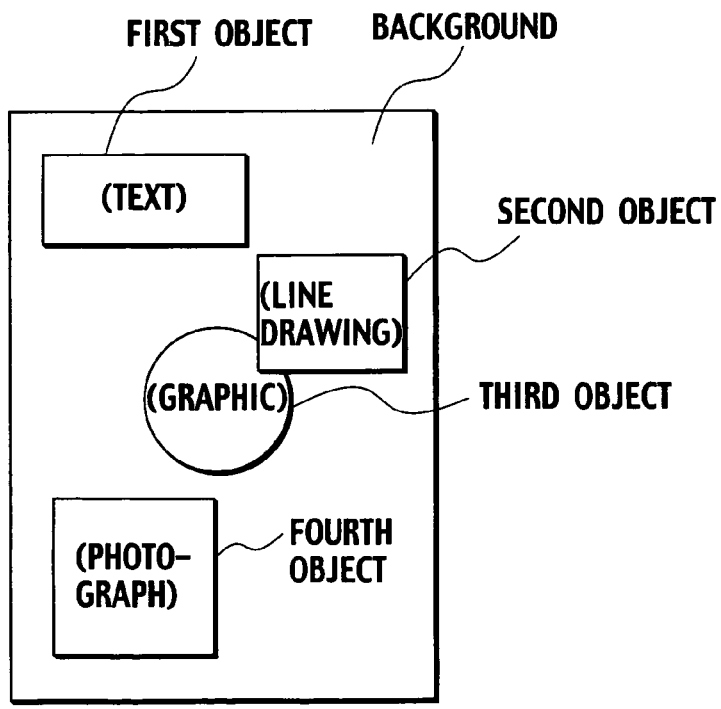
FIGS. 3A and 3B are tables showing an example of a color paper/color ink list.
FIG. 4 is a table showing an example of color combination information listed up, based on the color paper/color ink list shown in FIG. 3.
FIG. 5 is a view showing an example of sample image data.

Preferred embodiments according to the present invention are described hereinafter in detail with reference to FIGS. 1 to 14. Throughout the drawings, same or equivalent components bear same or equivalent reference numbers to omit or simplify description.

First Embodiment

FIG. 1 illustrates an image processing apparatus 100a of a first embodiment.

The image processing apparatus 100a, which can be realized by a personal computer or the like, provides a user with an optimum coloration when by the operation of the user the process of multicolor-printing a multicolor original image is performed. The image processing apparatus 100a processes image information (information concerning print of image) inputted from an input device 220 such as a keyboard, a mouse, thereby allowing the processed image information to be displayed over a display device 230 such as a display.

The image processing apparatus 100a comprises a storage device 120a storing various data (as described below in detail) and application programs (not shown), a processor 130a executing various operations, and an original making device 136.

The processor 130a comprises a color paper/color ink register 131, a color combinator 132, a color image creator 133, a color image provider 134, and a coloration selector 135a.

The storage device 120a stores therein a color paper/color ink list 121, color combination information 122, multicolor print information 123, sample image data 124, multicolor original image data 125, color image data 126, and coloration information 127.

The color paper/color ink register 131 automatically acquires information on m kinds of color papers (where m is a natural number) and information on n kinds of color inks (where n is a natural number), both which are usable for multicolor-printing, from a printing machine 210, and registers these information in the color paper/color ink list 121. Here information of color papers and color inks means the overall information of these colors, and typically includes measured color information represented in several color spaces. Alternatively, a user can directly input these information from the input device 220. Here, it does not matter if the color papers and color inks described above are of the types owned by the user or not.

The color combinator 132 reads out these information registered in the color paper/color ink list 121 from the color paper/color ink register 131, and lists up all combinations of k kinds of color papers arbitrarily selected from the m kinds of color papers and l kinds of color inks arbitrarily selected from the n kinds of color inks. Here "k" and "l" are natural numbers that the user assumes as the numbers of color papers and color inks, both which are to be used in actual multicolor-printing, respectively, and these numbers are inputted from the input device 220. Hereinafter, for simplicity the numbers "k" and "l" are restricted to "1" and "a natural number smaller than n", respectively. Further, each combination is referred hereinafter to as a "color combination element".

Then, the color combinator 132 stores all of the color combination elements in the storage device 120a as color combination information 122. Incidentally, in this case the number of all combinations is $T={}_mC_k \times {}_nC_l$ where the symbol "C" indicates a mathematical term "combination".

The color image creator 133 creates color image data 126 by coloring given image data for each color combination element of color combination information 122, based on multicolor print information 123. Here the given image data is preliminarily prepared as sample image data 124, or multicolor original image data 125 created by the user. This multicolor print information 123 includes color development information, associated with color development appearing when multicolor-printing is actually performed by using color papers and color inks, that compose each color combination element, and is preliminarily stored for each object that forms sample image data 124.

The color image provider 134 allows color image data 126 to be displayed over the display device 230 for each color combination element.

The coloration selector 135a selects the coloration of a colored image, that the user selects from among all colored images displayed over the display device 230, as an optimum coloration for actually multicolor-printing the multicolor original image, and stores the selected optimum coloration in the storage device 120a as coloration information 127. This corresponds to selecting an optimum color combination element for use in actually multicolor-printing the multicolor original image from among all color combination elements of color combination information 122.

The original making device 136 makes multicolor original image data 125 for use in actual multicolor-printing, based on coloration information 127.

FIG. 2 is a flowchart showing a procedure executed by the image processing apparatus 100a.

The procedure shown in FIG. 2 can be stored in a computer readable record medium in a form of computer program. The image processing apparatus 100a reads out the computer readable program, and executes various operations described in the read-out computer readable program.

In step S01, the color paper/color ink register 131 automatically acquires information on color papers and information on color inks, both which are usable for multicolor-printing, from the printing machine 210.

In step S02, the color paper/color ink register 131 discriminates whether or not a user inputs information on color papers and information on color inks, from the input device 220. If the discrimination is "yes", the color paper/color ink register 131 accepts these information inputted from the input device 220 in step S03 whereas if the discrimination is "no", the operation proceeds to step S04.

In step S04, the color paper/color ink register 131 registers these information in the color paper/color ink list 121. FIGS. 3A and 3B show an example of a color paper/color ink list 121 that stores information on two kinds (m=2) of color papers P1 and P2 (FIG. 3A) and information on three kinds (n=3) of color inks C1, C2, and C3 (FIG. 3B).

Next, for instance, if the user assumes 1 kind of color papers and 2 kinds of color inks as color papers and color inks for use in actual multicolor-printing, the user inputs these numbers "1" and "2" from the input device 220.

Then, in step S05, the color combinator 132 reads out these information registered in the color paper/color ink list 121 from the color paper/color ink register 131, and lists up all combinations of a color paper (P1 or P2) arbitrarily selected from the color papers (P1 and P2) and 2 kinds of color inks ((C1, C2), (C1, C3), or (C2, C3)) arbitrarily selected from the color inks (C1, C2, and C3). In this case, as shown in FIG. 4, the color combinator 132 lists up six kinds of color combination elements 1 to 6 by referring to the color paper/color ink list 121 shown in FIGS. 3A and 3B.

Then the color combinator 132 stores all of these color combination elements in the storage device 120a as color combination information 122.

Also, the more the numbers of color papers and color inks to be registered in the color paper/color ink list 121 increase, the more these of color combination elements to be listed up by the color combinator 132 increase. Under such a situation, selecting desired color combination element from among all color combination elements probably imposes a heavy burden on a user. In such a case, preliminarily removing color combination elements with a less color reproductivity and a less color difference in color inks enables the user to select the desired color combination element with high efficiency.

In step S06, the color image creator 133 determines which of sample image data 124 and multicolor original image data 125 is to be colored as image data. For instance, in cases where sample image data 124 and multicolor original image data 125 are stored in the storage device 120a, a user can select either one of these data by using the input device 220.

If in step S06 sample image data 124 is selected as image data to be colored, in step S07 the color image creator 133 creates color image data 126 by coloring sample image data 124 for each color combination element of color combination information 122. Then, in order that the user makes it easy to image coloration for the multicolor original image, a plurality of objects (such as a photograph, an illustration, a text, and a graphic) are prepared as sample image data 124. These objects consist of gray scale image data or binary image data, which processes gray scale image data with pseudo-tone.

FIG. 5 shows an example of sample image data 124. This sample image data 124 consists of four objects disposed on a background, that is, a first object (text), a second object (illustration), a third object (graphic), and a fourth object (photograph).

FIG. 6 shows a coloration preliminarily determined for each object shown in FIG. 5 as an example of multicolor print information 123 stored in the storage device 120a. In this example, multicolor print information 123 represents color development information for each object in terms of the color combination element 1 of color combination information 122.

The color image creator 133 colors each object based on multicolor print information 123. For instance, since the first object (text) is colored with the first color ink (C1), the resulting print color (a color printed on an actual print product) becomes the combination color of "the first color ink (C1)+the color paper (P1)", and since the fourth object (photograph) is colored with the first color ink (C1) and the second color ink (C2), the resultant print color becomes the combination color of "the first color ink (C1)+the second color ink (C2)+the color paper (P1)".

In general a color paper affects the color development of a color ink, and thus the color development of an actual print product depends on a color paper as well as a color ink. Therefore, the storage device 120a stores color development preliminarily measured for each color combination element of color combination information 122 as multicolor-print information 123. For example, Lab values in L*a*b* color space are measured for each color combination element, and the Lab values are converted into RGB values in RGB color space, which are used display process performed by the display device 230. The multicolor-print information 123 includes the RGB values and the Lab values. Also, in cases where multicolor-printing is performed with a plurality of color inks, since color development on an actual print product depends on printing order of color inks (for example, the first color ink (C1)→the second color ink (C2) or the second color ink (C2)→the first color ink (C1), for the fourth object), it is preferred that multicolor print information 123 is prepared in consideration of printing order of color inks. Incidentally, in this case multicolor print information 123 consists of 12 kinds of measured color information. In general multicolor print information 123 consists of $_mC_k \times _nP_l$ kinds of measured color information in contrast with the number of all color combination elements: $T=_mC_k \times _n C_l$. Here the symbol "P" indicates a mathematical term "Permutation".

If in step S06 multicolor original image data 125 is selected as image data to be colored, the color image creator 133 creates color image data 126 by coloring multicolor original image data 125, based on multicolor print information 123 for each color combination element of color combination information 122. In this case, since the coloration of multicolor original image data 125 is already designated by the original making device 136, coloring is executed by substituting the designated coloration with the first color ink, the second color ink, and the color paper of multicolor print information 123.

In step S09, the color image provider 134 allows color image data 126 for each color combination element of color combination information 122 to be displayed over the display device 230. FIGS. 7A and 7B show examples of coloring the sample image data shown in FIG. 5 for the color combination information shown in FIG. 4, based on the multicolor print information shown in FIG. 6. More particularly, FIG. 7A shows an example of color image data 126 colored on the basis of the "color combination element 1" of color combination information 122 shown in FIG. 4. In this figure, coloring is made as follows: the background is colored with the color paper P1; the first object the color ink (C1)+the color paper (P1); the second object the color ink (C2)+the color paper (P1); the third object the color ink (C1)+the color paper (P1); and the fourth object the color ink (C1)+the color ink (C2)+the color paper (P1). FIG. 7B shows an example of color image data 126 colored on the basis of the "color combination element 5" of color combination information 122 shown in FIG. 4. In this figure, the coloring is made as follows: the background is colored with the color paper (P2); the first object the color ink (C2)+the color paper (P2); the second object the color ink (C3)+the color paper (P2); the third object the color ink (C2)+the color paper (P2); and the fourth object the color ink (C2)+the color ink (C3)+the color paper (P3).

The user selects a colored image, which matches the user's image of a multicolor original image to be created, from among all colored images displayed over the display device 230, via the input device 220.

In step S10, the coloration selector 135a discriminate whether or not the user performs the selecting operation. If the discrimination is "no" the coloration selector 135a stands by until the user performs the selecting operation, and if the discrimination is "yes" the coloration selector 135a accepts the selection in step S11.

In step S12, the coloration selector 135a selects the coloration of the colored image selected by the user from among all colored images displayed over the display device 230 as an optimum coloration for actually multicolor-printing the multicolor original image, and stores the selected optimum coloration in the storage device 120a as coloration information 127. In such a way, an optimum color combination element for use in actually multicolor-printing the multicolor original image is selected from among all color combination elements of color combination information 122, and then the selected optimum color combination element is stored in the storage device 120a as coloration information 127.

Coloration information 127 stored in the storage device 120a is used for coloring multicolor original image data 125 to be executed by the original making device 136. Further, in a case (step S08) where the multicolor original image is colored on the basis of multicolor original image data 125, altering the coloration of each object and the background of multicolor original image data 125 to these of coloration information 127 allows the coloration of multicolor original image data 125 to be completed.

As described above, in the first embodiment, image data (a sample image or multicolor original image) colored for each combination of color papers and color inks, both which are usable for multicolor-printing, are created and provided to the user. Accordingly, without executing test prints, the user can easily select an optimum coloration realizing color development that matches the user's image of a multicolor original image to be created by merely selecting a desired colored image from among the displayed colored images. In addition, since the colored image provided to the user is considered in the color development of color papers as well as that of color inks, the user can review colorations closer to an actual print product.

Second Embodiment

In a second embodiment, an optimum coloration for a multicolor original image is automatically selected on the basis of color combination information 122.

Figure 8:
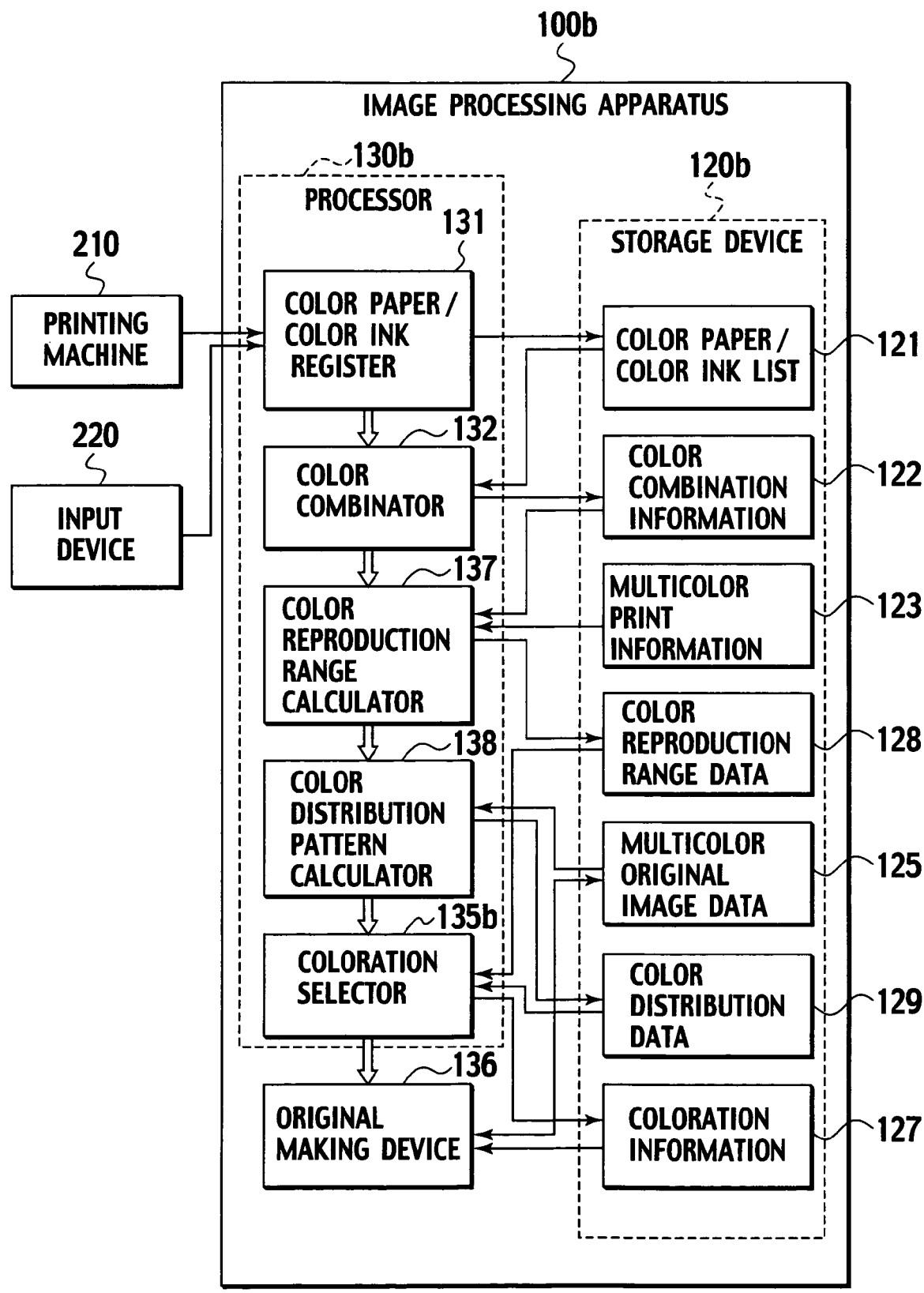
FIG. 8 is a schematic block diagram illustrating a structure of an image processing apparatus of a second embodiment.

FIG. 8 illustrates an image processing apparatus 100b of the second embodiment.

In the image processing apparatus 10b, the color paper/color ink register 131, the color combinator 132, the color paper/color ink list 121, color combination information 122, multicolor-print information 123, and multicolor original image data 125 are identical to these of the image processing device 100a of the first embodiment, and therefore the same descriptions are hereinafter omitted.

The image processing apparatus 100b comprises a color reproduction range calculator 137, a color distribution pattern calculator 138, a coloration selector 135b, and a storage device 120b, as well as the above components.

The color reproduction range calculator 137 calculates a color reproduction range for each color combination element of color combination information 122, based on multicolor print information 123, and stores the calculated color reproduction range in the storage device 120 as color reproduction range data 128.

The color distribution pattern calculator 138 calculates a color distribution pattern on a color space of multicolor original image data 125 made by the original making device 136, and stores the calculated color distribution pattern in the storage device 120 as color distribution data 129.

The coloration selector 135b automatically selects an optimum coloration for actually multicolor-printing multicolor original image data 125, based on color reproduction range data 128 and color distribution data 129. Then, the coloration selector 135b selects a color combination element that maximizes a degree (described later) of a color distribution pattern involved in the color reproduction range, from among all color combination elements (that is, color combination information 122) as an optimum color combination element.

Figure 9:
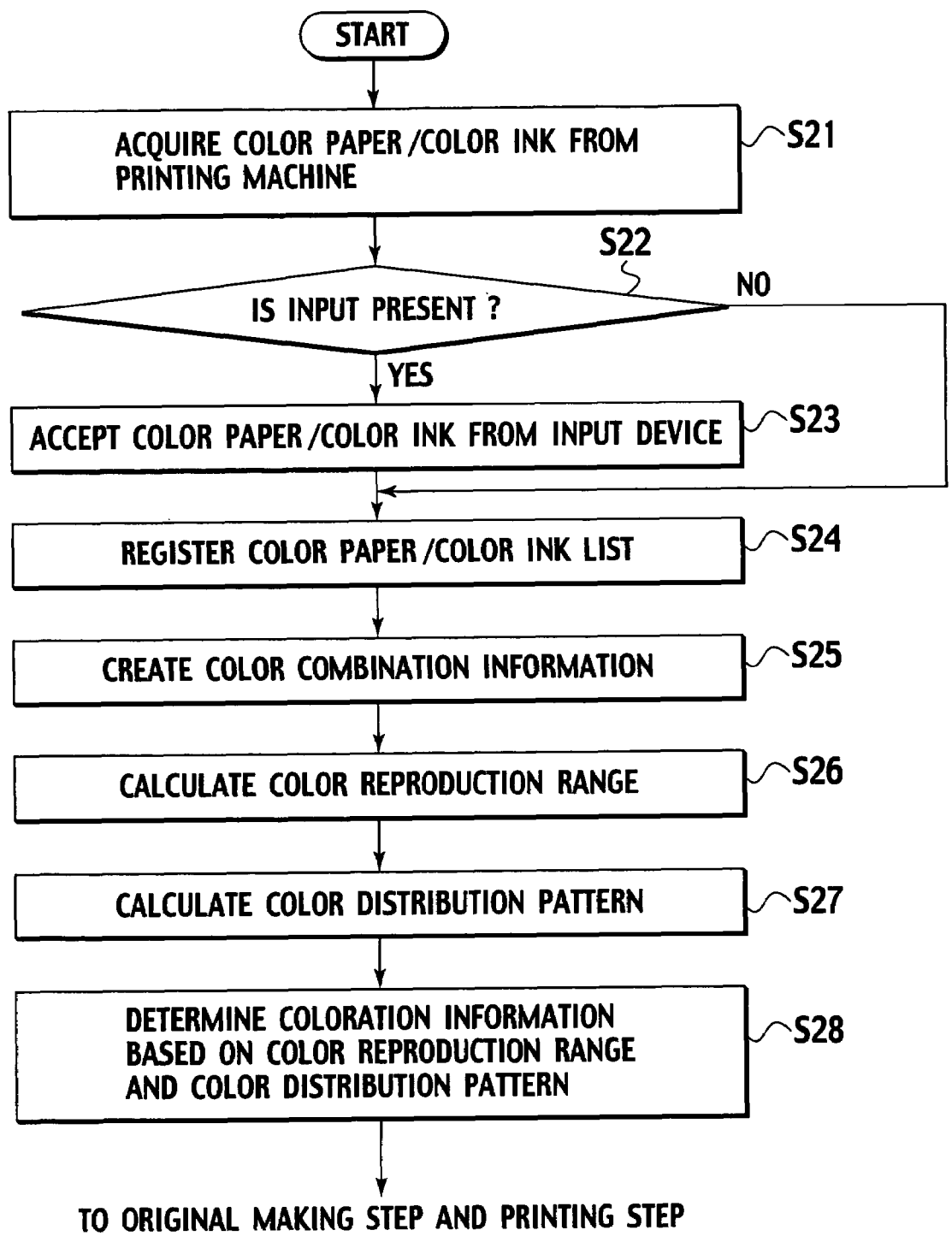
FIG. 9 is a flowchart showing an example of a procedure executed by the image processing apparatus shown in FIG. 8.

FIG. 9 is a flowchart showing an example of procedure executed by the image processing apparatus 10b.

Here, the processing operations in steps S21 to S25 in FIG. 9 are identical to those of steps S01 to S05 of the flowchart shown in FIG. 2, and hence the same descriptions are hereinafter omitted.

Further, the procedure shown in FIG. 9 can be stored in a computer readable record medium in a form of computer program. The image processing apparatus 100b reads out the computer readable program, and executes various operations described in the read-out computer readable program.

In step S26, the color reproduction range calculator 137 calculates a color reproduction range for each color combination element of color combination information 122, and stores the calculated color reproduction range in the storage device 120 as color reproduction range data 128.

Figure 10:
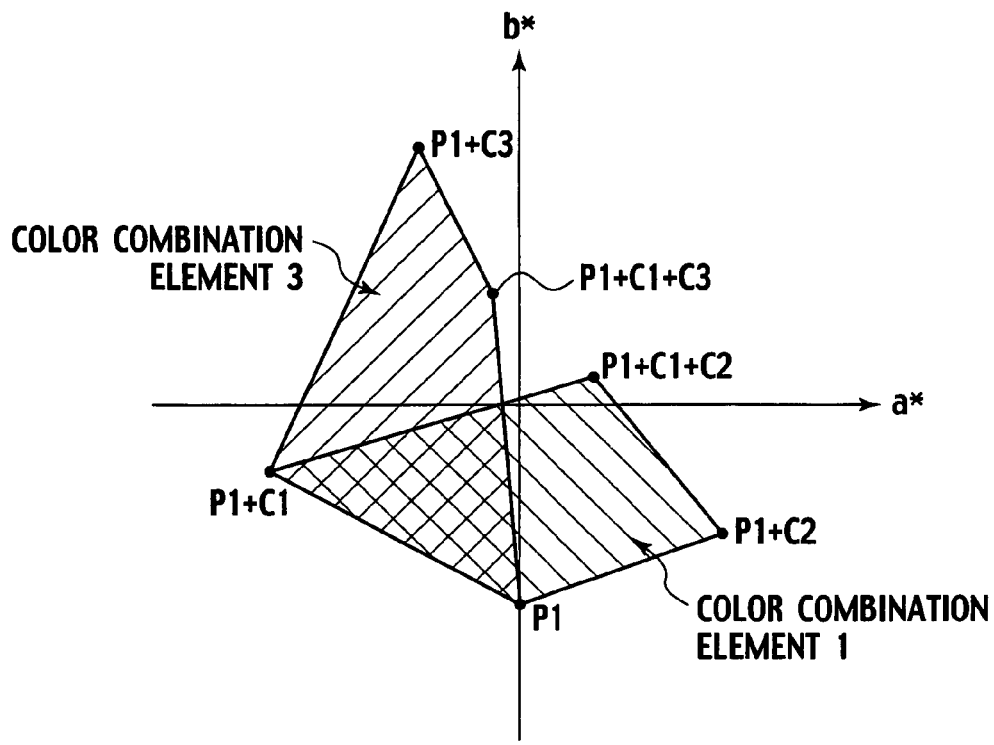
FIG. 10 is a view illustrating a color reproduction range (a*b* color plane) calculated by a color reproduction range calculator of the image processing apparatus shown in FIG. 8.

The color space, in which a color reproduction range is calculated, can be suitably selected from typical color spaces such as an RGB color space, an XYZ color space, L*a*b* color space, and L*u*v* color space. In the present embodiment, for ease of explanation, a color reproduction range in such a color space is assumed as a solid polygon having $$\sum_{i=0}^{l} {}_{l}C_{i}$$

vertices defined for each color combination element of color combination information 122 under the selection of a color paper (P1 or P2). The color development of each vertex is preliminarily measured and stored in multicolor print information 123. Since all color combination elements of the color combination information 122 shown in FIG. 4 have 2 kinds of color inks (that is, l=2), all solid polygons become a quadrangle because $$\sum_{i=0}^{2} {}_{2}C_{i} = 4$$

under the selection of a color paper (P1 or P2). Here, for example, the color measurement of the color combination element 1 is executed on the color paper P1 (background: vertex 1), the solid first color ink (C1)+the color paper (P1) (vertex 2), the solid second color ink (C2)+the color paper (P1) (vertex 3), and the solid first color ink (P1)+the solid second color ink (C2)+the color paper (P1) (vertex 4). If necessary, color measurements are also executed for a case where printing is conducted with various color inks in gray-scale. FIG. 10 illustrates a color reproduction range (on the a*b* color plane as one example) calculated on the basis of "color combination element 1" and "color combination element 3" of the color combination information 122 shown in FIG. 4 and the multicolor print information 123 shown in FIG. 6.

In step S27, the color distribution pattern calculator 138 calculates a color distribution on a color space of multicolor original image data 125 made by the original preparing device 136, and stores the calculated color distribution in the storage device 120 as color distribution data 129. More particularly, first, multicolor original image data 125 is rasterized for conversion to bitmap image data, and next, the bitmap image is plotted on the color space for each pixel to check the distribution of pixels used in the multicolor original image. Here the color space is divided into arbitrary blocks and a frequency (the number of pixels that are plotted) for each block is counted.

Figure 12:
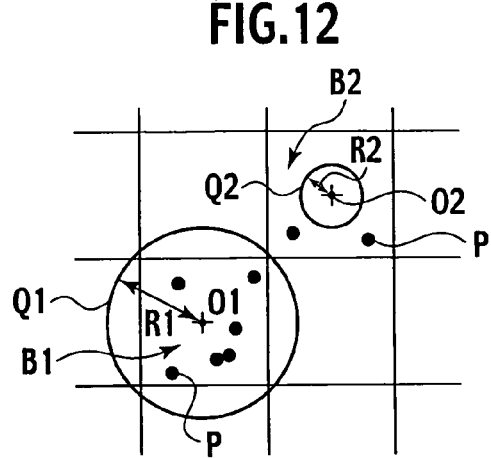
FIG. 12 is a view for explaining how the color distribution calculator calculates a color distribution pattern.
Figure 13:
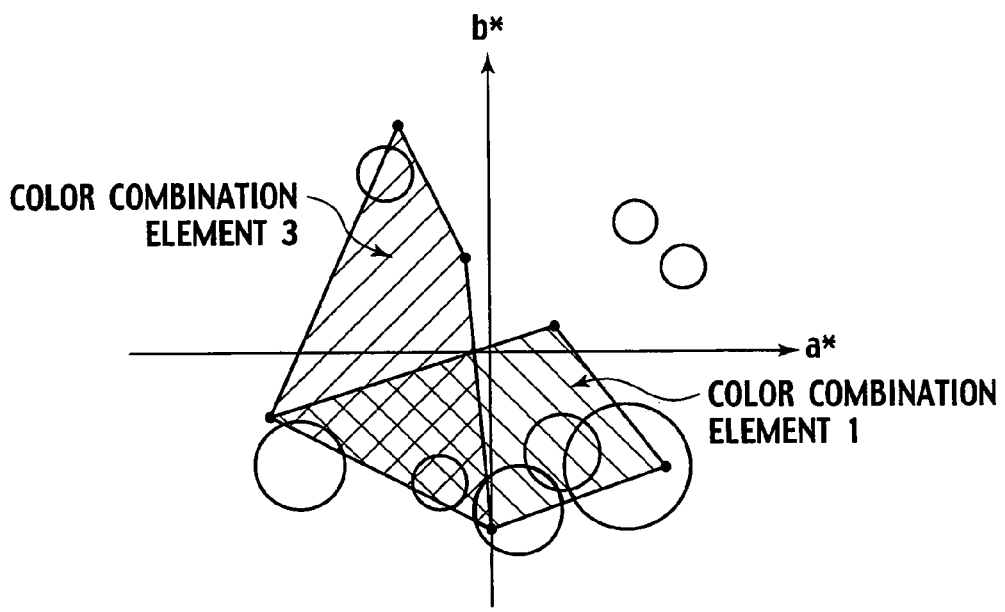
FIG. 13 is a view showing overlapped area of circles that form the color distribution pattern shown in FIG. 11 and the color reproduction range (a*b* color plane) shown in FIG. 10.
Figure 14:
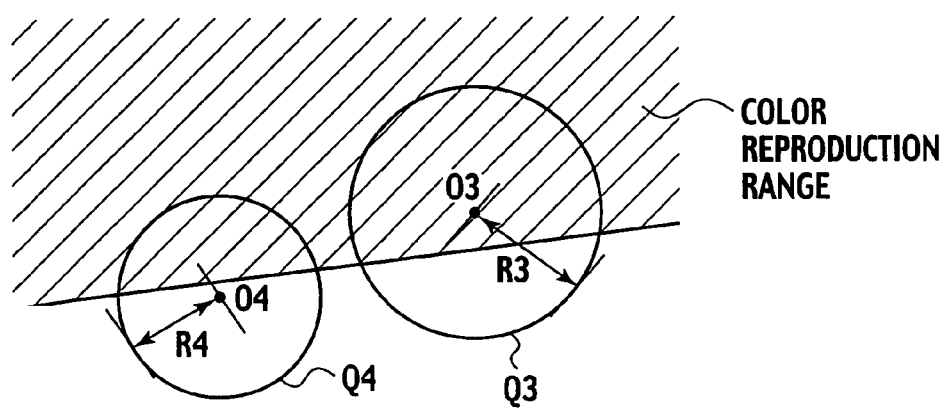
FIG. 14 is a view for explaining a process which discriminates whether or not a circle forming the color distribution pattern set by the color distribution calculator remains in the color reproduction range.

In the example shown in FIG. 12 the number of pixels P that are plotted inside the block B1 is six and the number of pixels P that are plotted inside the block B2 is two. Then, the circles Q1 and Q2 are described with centers at the points O1 and O2 of the blocks B1 and B2, respectively. Here the center points O1 and O2 represent typical colors of the blocks B1 and B2, respectively. Further, the radii R1 and R2 of the circles Q1 and Q2 are determined, depending on the number of pixels inside the blocks B1 and B2, respectively, and in particular the radii R1 and R2 increase in proportion to the number of pixels inside the blocks B1 and B2. This means that a color, close to the typical color of a block with the largest radius, is mainly used in the multicolor original image.

Figure 11:
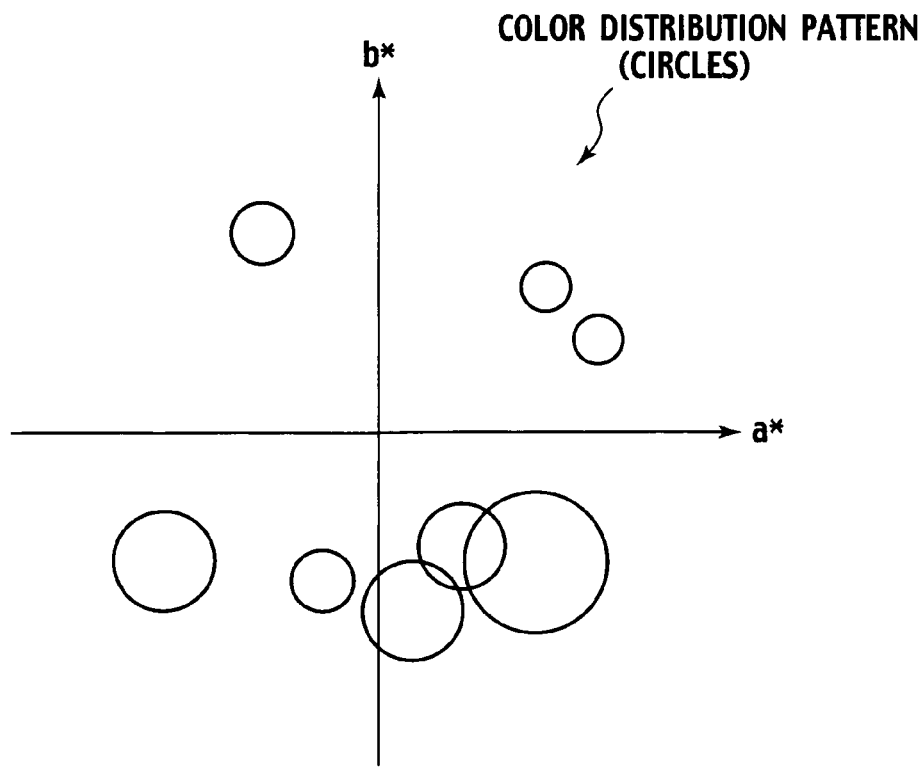
FIG. 11 is a view illustrating a color distribution pattern on a color space (a*b* color plane) calculated by a color distribution calculator of the image processing apparatus shown in FIG. 8, based on original image data.

FIG. 11 illustrates a color distribution pattern (on a*b* color plane) in a color space calculated on the basis of multicolor original image data 125.

Also, to calculate the color distribution of multicolor original image data 125, the color distribution pattern calculator 138 can targets only an image, such as a photograph and an illustration, in multicolor original image data 125 as an object to be counted. By so doing, coloration can be selected with a particular emphasis on the photograph and the illustration.

In step S28, the coloration selector 135b automatically selects a coloration (that is, an optimum color combination element of color combination information 122) which makes it possible to realize color development closest to color reproduction for actually multicolor-printing multicolor original image data 125, based on color reproduction range data 128 and color distribution data 129.

More particularly, first, the coloration selector 135b discriminates whether or not the center point of each circle, set by the color distribution pattern calculator 138, is involved in color reproduction ranges. In the example shown in FIG. 14, the discrimination becomes as follows: the center point O3 of the circle Q3 is involved in a color reproduction range, but the center point O4 of the circle Q4 is not involved in the color reproduction range.

Then the coloration selector 135b selects the coloration of a color combination element whose degree is maximum as an optimum coloration. Here the degree means a accumulated value of the radius of circles involved in a color reproduction range, or a ratio of the surface area of a color distribution pattern involved in a color reproduction range for the surface area of a color reproduction range. In the example shown in FIG. 13, the coloration of the "color combination element 1" is selected as an optimum coloration for actually multicolor-printing multicolor original image data 125.

The coloration selector 135b stores the coloration in the combination of the selected color paper and color inks in the storage device 120 as coloration information 127.

Coloration information 127, stored in the storage device 120, is used in the original making device 136 to actually multicolor-print multicolor original image data 125.

As described above, in the second embodiment, it becomes possible to automatically select the coloration of the combination of color papers and color inks operative to realize color development closest to the color reproduction of the made original image.

The entire content of Japanese Patent Application No. P2004-233313 with a filing data of Aug. 10, 2004 is herein incorporated by reference. Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. An image processing apparatus comprising:
    a color paper/color ink register registering information on m kinds of color papers and information on n kinds of color inks, both which are usable for multicolor-printing a multicolor original image, in a color paper/color ink list, where the numbers m and n are natural numbers, respectively;
    a color combinator listing up all combinations of k kinds of color papers, arbitrarily selected from the m kinds of color papers, and l kinds of color inks, arbitrarily selected from the n kinds of color inks, where the numbers k and l are natural numbers that satisfy $k \leq m$ and $l \leq n$, respectively;
    a color image creator creating color images colored in given image data corresponding to the multicolor original image for each combination; and
    a coloration selector selecting a coloration of a color image, selected by a user from among the color images, as a coloration for actually multicolor-printing the multicolor original image.

2. The image processing apparatus according to claim 1, wherein
    the color image creator creates the color images based on multicolor print information that are preliminarily stored as printing colors for each object that forms the given image data for each combination.

3. The image processing apparatus according to claim 1, wherein
    the color paper/color ink register automatically acquires information on the m kinds of color papers and information on the n kinds of color inks from a printing machine.

4. The image processing apparatus according to claim 1, wherein the numbers k and l are selected by the user.

5. An image processing apparatus, comprising:
    a color paper/color ink register registering information on m kinds of color papers and information on n kinds of color inks, both which are usable for multicolor-printing a multicolor original image, in a color paper/color ink list, where the numbers m and n are natural numbers, respectively;
    a color combinator listing up all combinations of k kinds of color papers, arbitrarily selected from the m kinds of color papers, and l kinds of color inks, arbitrarily selected from the n kinds of color inks, where the numbers k and l are natural numbers that satisfy $k \leq m$ and $l \leq n$, respectively;
    a color reproduction range calculator calculating a color reproduction range in a given color space for each combination;
    a color distribution pattern calculator calculating a color distribution pattern in the given color space based on the multicolored original image; and
    a coloration selector selecting a coloration for actually multicolor-printing the multicolored original image based on the color reproduction range and the color distribution pattern.

6. The image processing apparatus according to claim 5, wherein
    the color reproduction range calculator calculates the color reproduction range based on multicolor print information that are preliminarily stored as printing colors for each object that forms the multicolor original image for each combination.

7. The image processing apparatus according to claim 5, wherein
    the coloration selector selects a coloration for a combination that maximizes a degree of the color distribution pattern for the color reproduction range.

8. The image processing apparatus according to claim 7, wherein
    the degree of the color distribution pattern for the color reproduction range includes a ratio of surface areas of the color distribution pattern to a surface area of the color reproduction range.

9. The image processing apparatus according to claim 5, wherein
    the color paper/color ink register automatically acquires information on the m kinds of color papers and information on the n kinds of color inks from a printing machine.

10. The image processing apparatus according to claim 5, wherein the numbers k and l are selected by the user.

11. An image processing method comprising:
    registering information on m kinds of color papers and information on n kinds of color inks, both which are usable for multicolor-printing a multicolor original image, in a color paper/color ink list, where the numbers m and n are natural numbers, respectively;
    listing up all combinations of k kinds of color papers, arbitrarily selected from the m kinds of color papers, and l kinds of color inks, arbitrarily selected from the n kinds of color inks, where the numbers k and l are natural numbers that satisfy $k \leq m$ and $l \leq n$, respectively;
    creating color images colored in given image data corresponding to the multicolor original image for each combination; and
    selecting a coloration of a color image, selected by a user from among the color images, as a coloration for actually multicolor-printing the multicolor original image.

12. An image processing method comprising:
    registering information on m kinds of color papers and information on n kinds of color inks, both which are usable for multicolor-printing a multicolor original image, in a color paper/color ink list, where the numbers m and n are natural numbers, respectively;
    listing up all combinations of k kinds of color papers, arbitrarily selected from the m kinds of color papers, and l kinds of color inks, arbitrarily selected from the n kinds of color inks, where the numbers k and l are natural numbers that satisfy $k \leq m$ and $l \leq n$, respectively;
    calculating a color reproduction range in a given color space for each combination;

calculating a color distribution pattern in the given color space based on the multicolored original image; and selecting a coloration for actually overprinting the multicolored original image based on the color reproduction range and the color distribution pattern.

13. A computer program product for causing a computer to function as an image processing apparatus, the computer program product comprising:

a first computer program code for causing the computer to register information on m kinds of color papers and information on n kinds of color inks, both which are usable for multicolor-printing a multicolor original image, in a color paper/color ink list, where the numbers m and n are natural numbers, respectively;

a second computer program code for causing the computer to list up all combinations of k kinds of color papers, arbitrarily selected from the m kinds of color papers, and l kinds of color inks, arbitrarily selected from the n kinds of color inks, where the numbers k and l are natural numbers that satisfy $k \leq m$ and $l \leq n$, respectively;

a third computer program code for causing the computer to create color images colored in given image data corresponding to the multicolor original image for each combination; and a fourth computer program code for causing the computer to select a coloration of a color image, selected by a user from among the color images, as a coloration for actually multicolor-printing the multicolor original image.

14. The computer program product according to claim 13, wherein the third computer program code further causes the computer to create the color images based on multicolor print information that are preliminarily stored as printing colors for each object that forms the given image data for each combination.

15. A computer program product for causing a computer to function as an image processing apparatus, the computer program product comprising:

a first computer program code for causing the computer to register information on m kinds of color papers and information on n kinds of color inks, both which are usable for multicolor-printing a multicolor original image, in a color paper/color ink list, where the numbers m and n are natural numbers, respectively;

a second computer program code for causing the computer to list up all combinations of k kinds of color papers, arbitrarily selected from the m kinds of color papers, and l kinds of color inks, arbitrarily selected from the n kinds of color inks, where the numbers k and l are natural numbers that satisfy $k \leq m$ and $l \leq n$, respectively;

a third computer program code for coursing the computer to calculate a color reproduction range in a given color space for each combination;

a fourth computer program code for causing the computer to calculating a color distribution pattern in the given color space based on the multicolored original image; and a fifth computer program code for causing the computer to select a coloration for actually overprinting the multicolored original image based on the color reproduction range and the color distribution pattern.

16. The computer program product according to claim 15, wherein the third computer program code further causes the computer to calculate the color reproduction range based on multicolor print information that are preliminarily stored as printing colors for each object that forms the multicolor original image for each combination.

* * * * *